US012737160B2

(12) United States Patent
Wiseman et al.

(10) Patent No.: US 12,737,160 B2
(45) Date of Patent: Sep. 15, 2026

(54) CONTEXT INJECTION FOR ARTIFICIAL INTELLIGENCE (AI) CODING ASSISTANTS

(71) Applicant: Goldman Sachs & Co. LLC, New York, NY (US)

(72) Inventors: Bella Wiseman, Brooklyn, NY (US); Bing Xiang, Irvington, NY (US); Jaimita Bansal, Jersey City, NJ (US); Nizar Tyrewalla, Redmond, WA (US); Rohan Deshpande, Mercer Island, WA (US)

(73) Assignee: Goldman Sachs & Co. LLC, New York, NY (US)

( * ) Notice: Subject to any disclaimer, the term of this patent is extended or adjusted under 35 U.S.C. 154(b) by 0 days.

(21) Appl. No.: 19/265,860

(22) Filed: Jul. 10, 2025

(65) Prior Publication Data

US 2026/0072655 A1 Mar. 12, 2026

Related U.S. Application Data

(60) Provisional application No. 63/691,655, filed on Sep. 6, 2024.

(51) Int. Cl.
*G06F 8/35* (2018.01)

(52) U.S. Cl.
CPC .................................... *G06F 8/35* (2013.01)

(58) Field of Classification Search
CPC ........................................................ G06F 8/35
See application file for complete search history.

(56) References Cited

U.S. PATENT DOCUMENTS

| | | | | |
|---|---|---|---|---|
| 12,360,791 | B1 * | 7/2025 | Vadaparty | G06F 8/31 |
| 2021/0279042 | A1 * | 9/2021 | Allamanis | G06F 8/33 |
| 2023/0018088 | A1 | 1/2023 | Singh et al. | |
| 2024/0070270 | A1 * | 2/2024 | Mace | G06F 21/554 |
| 2024/0086164 | A1 | 3/2024 | Kramer | |
| 2024/0256423 | A1 * | 8/2024 | Zhang | G06F 8/71 |

(Continued)

FOREIGN PATENT DOCUMENTS

WO 2023240149 A1 12/2023

OTHER PUBLICATIONS

Arkil Patel et al., "Evaluating In-Context Learning of Libraries for Code Generation," Apr. 4, 2024 [retrieved Sep. 16, 2025], pp. 1-19, downloaded from <url>:https://arxiv.org/abs/2311.09635. (Year: 2024).*

(Continued)

*Primary Examiner* — S. Sough
*Assistant Examiner* — Stephen D Berman

(57) ABSTRACT

A method includes obtaining a user input for an artificial intelligence (AI) coding assistant, where the user input requests generation, modification, or analysis of code. The method also includes generating a prompt for the AI coding assistant using the user input and additional data relevant to the user input. The method further includes providing the prompt to the AI coding assistant. The additional data is included in the prompt and informs the AI coding assistant of a context associated with the user input. The additional data customizes the AI coding assistant to generate code in a coding language on which the AI coding assistant is not trained by providing curated examples of coding language syntax designed for consumption by the AI coding assistant.

20 Claims, 5 Drawing Sheets

(56) References Cited

U.S. PATENT DOCUMENTS

| | | | | |
|---|---|---|---|---|
| 2024/0361996 | A1* | 10/2024 | Fu | G06F 8/33 |
| 2024/0403564 | A1* | 12/2024 | Bendersky | G06N 3/045 |
| 2025/0123814 | A1* | 4/2025 | McMorran | G06N 3/044 |
| 2025/0156198 | A1* | 5/2025 | Kaliyaperumal | G06F 3/0481 |
| 2025/0245446 | A1* | 7/2025 | Ayed | G06F 16/90332 |

OTHER PUBLICATIONS

Fengji Zhang et al., "RepoCoder: Repository-Level Code Completion Through Iterative Retrieval and Generation," Oct. 20, 2023 [ retrieved Sep. 19, 2025], pp. 1-14, downloaded from <url>:https://arxiv.org/abs/2303.12570 (Year: 2023).*

Shuyan Zhou et al., "DocPrompting: Generating Code by Retrieving the Docs," Feb. 18, 2023 [retrieved Sep. 17, 2025], pp. 1-19, downloaded from <url>:https://arxiv.org/abs/2207.05987. (Year: 2023).*

Yuxiang Wei et al., "Magicoder: Empowering Code Generation with OSS-Instruct," Jun. 7, 2024 [retrieved Sep. 19, 2025], pp. 1-26, downloaded from <url>:https://arxiv.org/abs/2312.02120. (Year: 2024).*

Qinyu Luo et al., "RepoAgent: An LLM-Powered Open-Source Framework for Repository-level Code Documentation Generation", Feb. 26, 2024 [retrieved Feb. 5, 2026], pp. 1-30, downloaded from <url>:https://arxiv.org/pdf/2402.16667. (Year: 2024).*

Noor Nashid et al., "Retrieval-Based Prompt Selection for Code-Related Few-Shot Learning", Jul. 14, 2023, 2023 IEEE/ACM 45th International Conference on Software Engineering (ICSE), pp. 2450-2462, downloaded from <url>:https://ieeexplore.ieee.org/stamp/stamp.jsp?tp=&arnumber=10172590. (Year: 2023).*

Noor Nashid et al., "Contextual API Completion for Unseen Repositories Using LLMs", May 14, 2024 [retrieved May 16, 2026], pp. 1-13, downloaded from <url>:https://arxiv.org/abs/2405.04600. (Year: 2024).*

Steven Ross et al., "The Programmer's Assistant: Conversational Interaction with a Large Language Model for Software Development", Mar. 27, 2023 [retrieved May 16, 2026], pp. 491-514, downloaded from <url>:https://dl.acm.org/doi/abs/10.1145/3581641.3584037. (Year: 2023).*

Daye Nam et al., "Using an LLM to Help With Code Understanding", Apr. 12, 2024 [retrieved May 16, 2026], pp. 1-13, downloaded from <url>:https://dl.acm.org/doi/abs/10.1145/3597503.3639187. (Year: 2024).*

International Search Report and Written Opinion of the International Searching Authority dated Nov. 17, 2025 in connection with International Patent Application No. PCT/US2025/037964, 9 pages.

Bassamzadeh et al., "A Comparative Study of DSL Code Generation: Fine-Tuning vs. Optimized Retrieval Augmentation," arXiv:2407.02742v1 [cs.SE], Jul. 2024, 8 pages.

Microsoft Developer, "What programming languages does GitHub Copilot support?", YouTube video [https://www.youtube.com/watch?v=SbRc-D6FqM4], Aug. 2023, 4 pages.

Wayback Machine, Visual Studio Code, "Chat Extensions," webpage [https://web.archive.org/web/20240229225608/https://code.visualstudio.com/api/extension-guides/chat], Feb. 2024, 11 pages.

* cited by examiner

CONTEXT INJECTION FOR ARTIFICIAL INTELLIGENCE (AI) CODING ASSISTANTS

CROSS-REFERENCE TO RELATED APPLICATION AND PRIORITY CLAIM

This application claims priority under 35 U.S.C. § 119(e) to U.S. Provisional Patent Application No. 63/691,655 filed on Sep. 6, 2024, which is hereby incorporated by reference in its entirety.

TECHNICAL FIELD

This disclosure is generally directed to machine learning systems and processes. More specifically, this disclosure is directed to context injection for artificial intelligence (AI) coding assistants.

BACKGROUND

Artificial intelligence (AI) coding assistants provide machine learning-based generation and modification of computer code. AI coding assistants help developers write, debug, explain, and refactor code using generative AI. As a result, AI coding assistants may help to greatly simplify and speed up the creation of computer code.

SUMMARY

This disclosure relates to context injection for artificial intelligence (AI) coding assistants.

In a first embodiment, a method includes obtaining a user input for an AI coding assistant, where the user input requests generation, modification, or analysis of code. The method also includes generating a prompt for the AI coding assistant using the user input and additional data relevant to the user input. The method further includes providing the prompt to the AI coding assistant. The additional data is included in the prompt and informs the AI coding assistant of a context associated with the user input. The additional data customizes the AI coding assistant to generate code in a coding language on which the AI coding assistant is not trained by providing curated examples of coding language syntax designed for consumption by the AI coding assistant.

In a second embodiment, an apparatus includes at least one processing device configured to obtain a user input for an AI coding assistant, where the user input requests generation, modification, or analysis of code. The at least one processing device is also configured to generate a prompt for the AI coding assistant using the user input and additional data relevant to the user input and provide the prompt to the AI coding assistant. The additional data is included in the prompt and is configured to inform the AI coding assistant of a context associated with the user input. The additional data is configured to customize the AI coding assistant to generate code in a coding language on which the AI coding assistant is not trained by providing curated examples of coding language syntax designed for consumption by the AI coding assistant.

In a third embodiment, a non-transitory computer readable medium contains instructions that when executed cause at least one processor to obtain a user input for an AI coding assistant, where the user input requests generation, modification, or analysis of code. The non-transitory computer readable medium also contains instructions that when executed cause the at least one processor to generate a prompt for the AI coding assistant using the user input and additional data relevant to the user input and provide the prompt to the AI coding assistant. The additional data is included in the prompt and is configured to inform the AI coding assistant of a context associated with the user input. The additional data is configured to customize the AI coding assistant to generate code in a coding language on which the AI coding assistant is not trained by providing curated examples of coding language syntax designed for consumption by the AI coding assistant.

Any single one or any combination of the following features may be used with the first, second, or third embodiment. The additional data relevant to the user input may be generated using a trained machine learning model, and the additional data may include code examples that fit within a context length of the AI coding assistant. The additional data may include multiple guide files, and the multiple guide files may be associated with a hierarchy in which (i) a primary guide file may introduce more general concepts of a specified coding language and (ii) in-depth guide files may introduce more complex concepts of the specified coding language. The additional data may include text and code snippets. The additional data may explicitly instruct the AI coding assistant to override a concept supported by one or more other coding languages in order to implement the concept in a specified coding language in a different manner. The AI coding assistant may have a semantic understanding of a specified concept, and the additional data may allow the AI coding assistant to use the semantic understanding with the coding language on which the AI coding assistant is not trained to produce code relevant to the specified concept. The additional data may allow the AI coding assistant to use a semantic understanding of a class associated with a coding language on which the AI coding assistant is trained with the coding language on which the AI coding assistant is not trained. The additional data relevant to the user input may be generated by identifying an intent associated with the user input, identifying one or more data sources based on the intent, obtaining data relevant to the user input from the one or more data sources, ranking and filtering the data obtained from the one or more data sources, and limiting a length of the ranked and filtered data based on a context length limit of the AI coding assistant.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
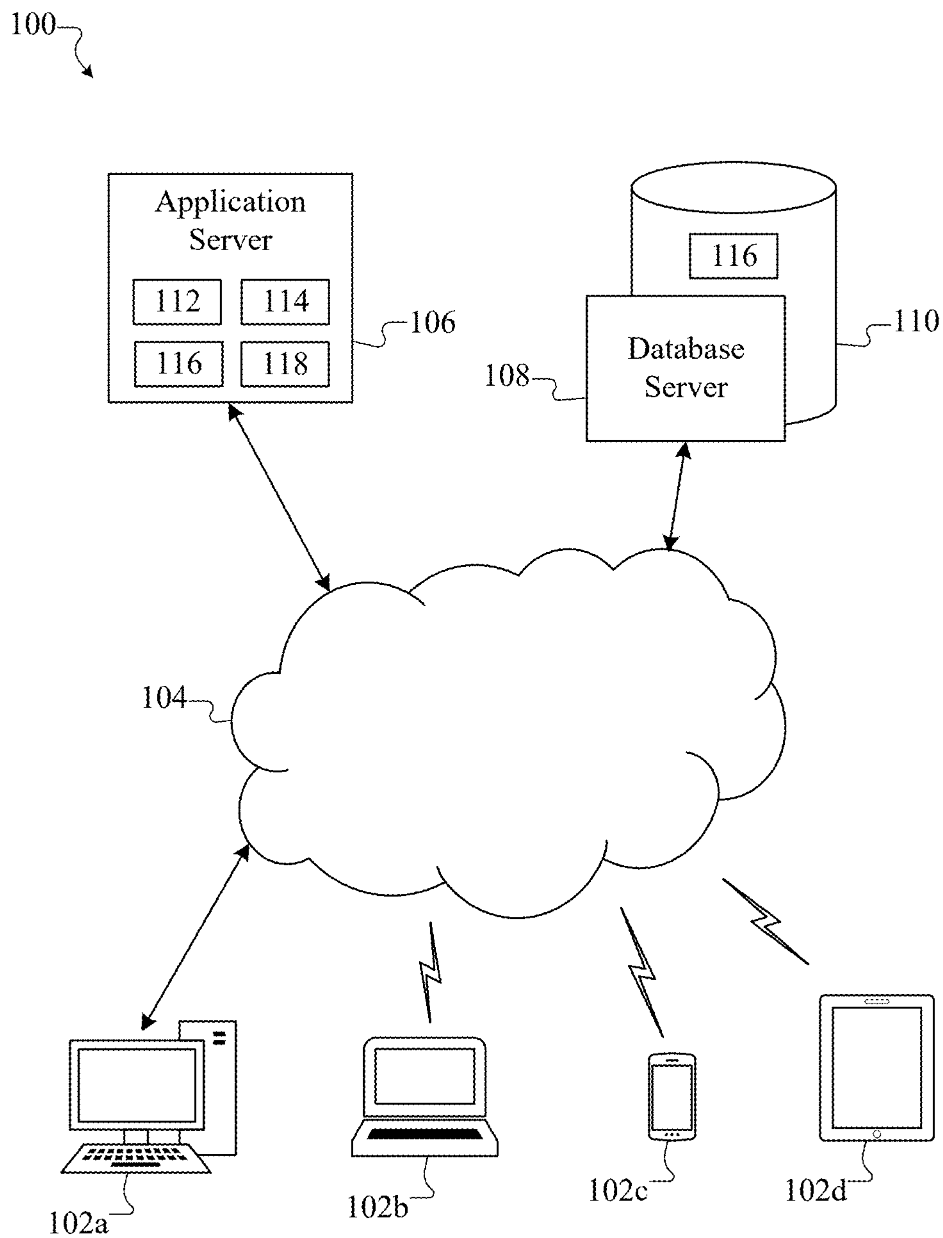
FIG. 1 illustrates an example system supporting context injection for an artificial intelligence (AI) coding assistant according to this disclosure.

FIGS. 1 through 7, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, artificial intelligence (AI) coding assistants provide machine learning-based generation and modification of computer code. AI coding assistants help developers write, debug, explain, and refactor code using generative AI. As a result, AI coding assistants may help to greatly simplify and speed up the creation of computer code. However, these AI coding assistants are often trained using training data associated with the most popular coding languages and coding platforms. When asked to generate code in another coding language (such as a custom language) not represented in the training data, the AI coding assistants often need to be fine-tuned for that specific use case, which can be a slow and expensive process.

This disclosure provides techniques supporting context injection for AI coding assistants. As described in more detail below, a user input to an AI coding assistant can be obtained, where the user input requests generation, modification, or analysis of code. A prompt for the AI coding assistant can be generated using the user input and additional data relevant to the user input and provided to the AI coding assistant. The additional data can be included in the prompt and can inform the AI coding assistant of a context associated with the user input. As a result, the additional data can customize the AI coding assistant to generate code in a coding language on which the AI coding assistant is not trained by providing curated examples of coding language syntax designed for consumption by the AI coding assistant.

In some cases, the additional data relevant to the user input may be generated using a trained machine learning model, such as a large language model (LLM). As an example, the additional data relevant to the user input may be generated by identifying an intent associated with the user input, identifying one or more data sources based on the intent, obtaining data relevant to the user input from the one or more data sources, ranking and filtering the data obtained from the one or more data sources, and limiting a length of the ranked and filtered data based on a context length limit of the AI coding assistant. Also, in some cases, the additional data may include multiple guide files, and the multiple guide files may be associated with a hierarchy in which (i) a primary guide file introduces more general concepts of a specified coding language and (ii) in-depth guide files introduce more complex concepts of the specified coding language. Moreover, in some cases, the additional data may include text and synthetic or other code snippets. Further, in some cases, the additional data may explicitly instruct the AI coding assistant to override a concept supported by one or more other coding languages in order to implement the concept in a specified coding language in a different manner. In addition, in some cases, the AI coding assistant may have semantic understanding of one or more specified concepts, and the additional data may allow the AI coding assistant to use the semantic understanding with the coding language on which the AI coding assistant is not trained. For instance, the additional data may allow the AI coding assistant to use a semantic understanding of a class associated with one or more coding languages on which the AI coding assistant is trained with the coding language on which the AI coding assistant is not trained.

The disclosed techniques therefore provide a systematic framework for faster customization of AI coding assistants for languages on which the AI coding assistants are not trained. For example, AI coding assistants may have the ability to pull in context from files within an Integrated Developer Environment (IDE), and the disclosed techniques may make use of this ability to provide guide files or other additional information to help customize the AI coding assistants. The disclosed techniques can also allow for the generation and use of guide files that (among other things) provide examples of custom libraries or languages, and the guide files can be included in prompts to the AI coding assistants for use when generating or modifying code. The disclosed techniques can further support the generation of the guide files using one or more LLMs or other automated approaches, such as when the one or more LLMs are used to generate guide files from large corpuses of documentation and the guide files are optimized to include the most relevant and useful examples in the smallest number of tokens possible. This can help to keep the guide files to a size that is within context limitations of the AI coding assistants. Overall, the disclosed techniques can provide a simpler and more cost-effective approach to customization of AI coding assistants.

FIG. 1 illustrates an example system 100 supporting context injection for an AI coding assistant according to this disclosure. As shown in FIG. 1, the system 100 includes multiple user devices **102*a*-102*d*, at least one network 104, at least one application server 106, and at least one database server 108 associated with at least one database 110**. Note, however, that other combinations and arrangements of components may also be used here.

In this example, each user device **102*a*-102*d* is coupled to or communicates over the network(s) 104. Communications between each user device 102*a*-102*d* and at least one network 104 may occur in any suitable manner, such as via a wired or wireless connection. Each user device 102*a*-102*d* represents any suitable device or system used by at least one user to provide information to the application server 106 or database server 108 or to receive information from the application server 106 or database server 108. Any suitable number(s) and type(s) of user devices 102*a*-102*d* may be used in the system 100. In this particular example, the user device 102*a* represents a desktop computer, the user device 102*b* represents a laptop computer, the user device 102*c* represents a smartphone, and the user device 102*d* represents a tablet computer. However, any other or additional types of user devices may be used in the system 100. Each user device 102*a*-102*d*** includes any suitable structure configured to transmit and/or receive information, such as devices that can transmit user input queries and that can receive and present responses to the user input queries.

The at least one network 104 facilitates communication between various components of the system 100. For example, the network(s) 104 may communicate Internet Protocol (IP) packets, frame relay frames, Asynchronous Transfer Mode (ATM) cells, or other suitable information between network addresses. The network(s) 104 may include one or more local area networks (LANs), metropolitan area networks (MANs), wide area networks (WANs), all or a portion of a global network such as the Internet, or any other communication system or systems at one or more locations. The network(s) 104 may also operate according to any appropriate communication protocol or protocols.

The application server 106 is coupled to the at least one network 104 and is coupled to or otherwise communicates with the database server 108. The application server 106 supports various functions related to context injection for AI coding assistants. For example, the application server 106 may execute at least one application 112 that processes input queries from users and generates prompts for one or more AI coding assistants 114. The one or more AI coding assistants 114 can use the prompts to generate computing code or perform related functions, such as by writing, debugging, explaining, and/or refactoring computing code. In some cases, the at least one application 112 may use or have access to guide files 116, which can be included in or otherwise associated with the prompts. Also, in some cases, the database 110 may be used to store the guide files 116. In addition, in some cases, one or more large language models (LLMs) or other machine learning models 118 may be used to generate one or more of the guide files 116.

The database server 108 operates to store and facilitate retrieval of various information used, generated, or collected by the application server 106 and the user devices 102*a*-102*d* in the database 110. For example, the database server 108 may store the guide files 116. While the database server 108 and database 110 are shown here as being separate from the application server 106, the application server 106 may itself incorporate the database server 108 and the database 110.

Although FIG. 1 illustrates one example of a system 100 supporting context injection for an AI coding assistant, various changes may be made to FIG. 1. For example, the system 100 may include any number of user devices 102*a*-102*d*, networks 104, application servers 106, database servers 108, databases 110, applications 112, AI coding assistants 114, guide files 116, and machine learning models 118. Also, these components may be located in any suitable locations and might be distributed over a large area. In addition, while FIG. 1 illustrates one example operational environment in which context injection for AI coding assistants may be used, this functionality may be used in any other suitable system.

Figure 2:
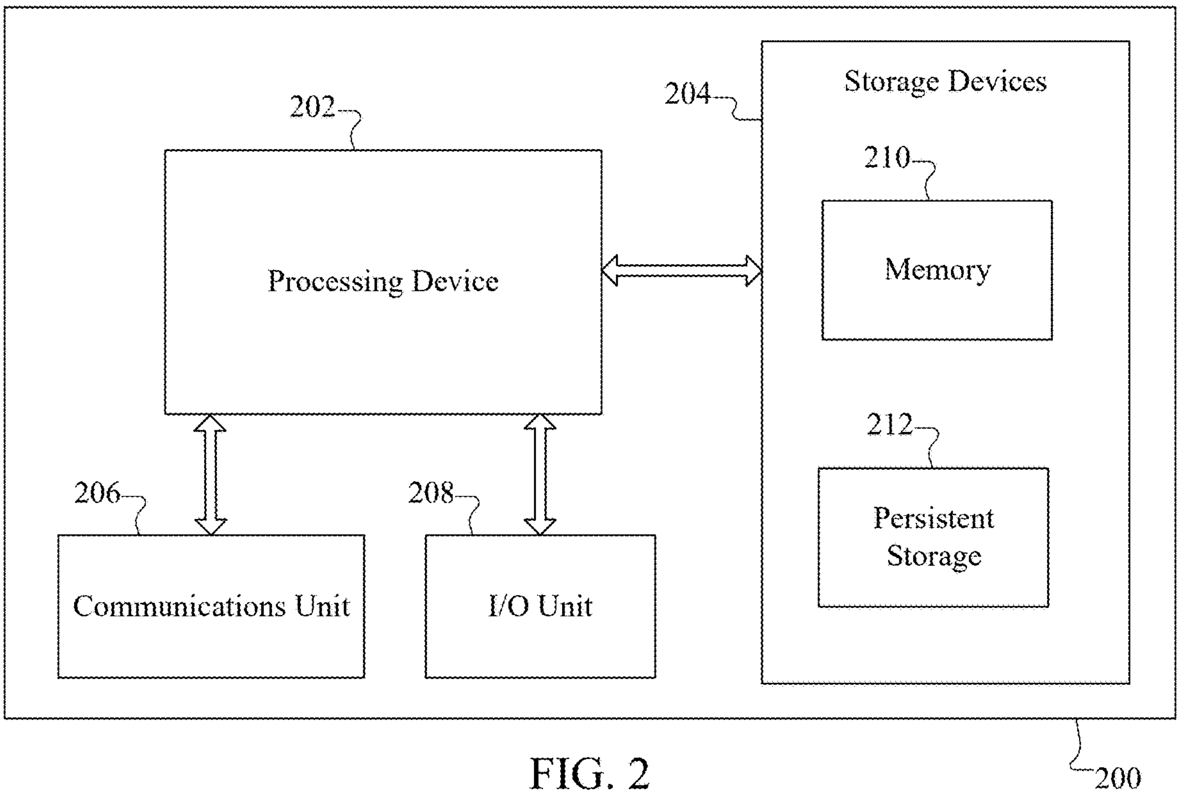
FIG. 2 illustrates an example device supporting context injection for an AI coding assistant according to this disclosure.

FIG. 2 illustrates an example device 200 supporting context injection for an AI coding assistant according to this disclosure. One or more instances of the device 200 may, for example, be used to at least partially implement the functionality of the application server 106 of FIG. 1. However, the functionality of the application server 106 may be implemented in any other suitable manner. In some embodiments, the device 200 shown in FIG. 2 may form at least part of a user device 102*a*-102*d*, application server 106, or database server 108 in FIG. 1. However, each of these components may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other processing devices in any suitable arrangement. Example types of processing devices 202 include one or more microprocessors, microcontrollers, digital signal processors (DSPs), application specific integrated circuits (ASICs), field programmable gate arrays (FPGAs), graphics processing units (GPUs), neural processing units (NPUs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network. The communications unit 206 may support communications through any suitable physical or wireless communication link(s). As a particular example, the communications unit 206 may support communication over the network(s) 104 of FIG. 1.

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the I/O unit 208 may be omitted if the device 200 does not require local I/O, such as when the device 200 represents a server or other device that can be accessed remotely.

In some embodiments, the instructions executed by the processing device 202 include instructions that implement or support the use of the application(s) 112. Thus, for example, the instructions executed by the processing device 202 may cause the device 200 to obtain user input queries, generate prompts (possibly including relevant guide files 116 or other information), and provide the prompts to one or more AI coding assistants 114. The instructions executed by the processing device 202 may also cause the device 200 to use the machine learning model(s) 118 to generate the guide files 116 or other information. The instructions executed by the processing device 202 may further cause the device 200 to receive code generated by the AI coding assistant(s) 114 and use the code in any suitable manner, such as by providing the generated code to devices of the users who provided the input queries.

Although FIG. 2 illustrates one example of a device 200 supporting context injection for an AI coding assistant, various changes may be made to FIG. 2. For example, computing and communication devices and systems come in a wide variety of configurations, and FIG. 2 does not limit this disclosure to any particular computing or communication device or system.

Figure 3:
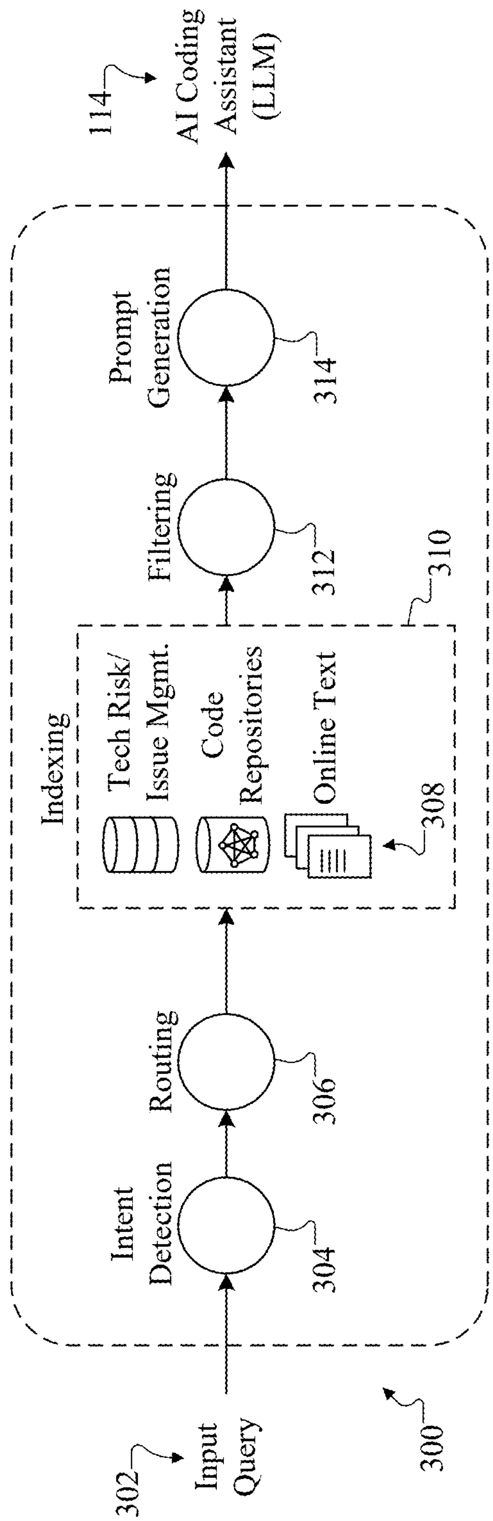
FIG. 3 illustrates an example architecture supporting context injection for an AI coding assistant according to this disclosure.

FIG. 3 illustrates an example architecture 300 supporting context injection for an AI coding assistant according to this disclosure. For ease of explanation, the architecture 300 shown in FIG. 3 is described as being implemented using the application server 106 in the system 100 shown in FIG. 1, where the application server 106 may include one or more instances of the device 200 shown in FIG. 2. However, the architecture 300 may be implemented using any other suitable device(s) and in any other suitable system(s).

As shown in FIG. 3, the architecture 300 can be used to generate prompts for an AI coding assistant 114, which represents or includes a large language model or other machine learning model. The prompts for the AI coding assistant 114 can be generated in response to user questions or other input queries 302. The input queries 302 represent requests for the AI coding assistant 114 to generate, modify, analyze, or perform other functions related to code. For example, the input queries 302 may include user requests for the AI coding assistant 114 to write new code or modify existing code, such as by debugging or refactoring code (refactoring code generally involves restructuring the code while preserving its overall functionality). The input queries 302 may also include user requests for the AI coding assistant 114 to explain the operation of new or existing code. However, the AI coding assistant 114 may receive and process any other suitable requests related to new or existing code.

In this example, the architecture 300 performs various operations to generate prompts for the AI coding assistant 114. For example, the architecture 300 includes an intent detection operation 304, which generally operates to identify an intent associated with each input query 302. The intent detection operation 304 may identify one or more of a number of predefined or other intents as being associated with each input query 302. Examples of possible intents may include creating new code, debugging existing code, refactoring existing code, and explaining operation of code. These or other intents can be identified by processing the contents of each input query 302 and seeing what a user is requesting. In some embodiments, for instance, the intent of each input query 302 may be identified using a large language model or other machine learning model. Depending on the implementation, the machine learning model used for intent detection may or may not be the same machine learning model used to implement one or more other functions of the architecture 300 or the same machine learning model used to implement the AI coding assistant 114.

A routing operation 306 generally operates to identify one or more data sources 308 to be used when generating an AI coding assistant prompt for each input query 302, where the one or more data sources 308 for each input query 302 are based at least partially on the intent for that input query 302. For example, the intent identified by the intent detection operation 304 for each input query 302 can be provided to the routing operation 306, and the routing operation 306 can use the intent to identify one or more data sources 308 based on the intent for that input query 302. In this way, the routing operation 306 supports context retrieval, meaning the identification of contextual information defining or associated with the context of each input query 302. The contextual information can be obtained using data from the one or more data sources 308 for that input query 302.

The routing operation 306 may use any suitable technique (s) to identify one or more data sources 308 for each input query 302. For example, in some cases, data from each data source 308 may be represented using embeddings, and the routing operation 306 may use one or more embeddings associated with each input query 302 to identify one or more data sources 308 having data that appears most relevant to that input query 302 based on the embeddings. Any suitable measure of similarity between embeddings may be used here, such as cosine similarity or Euclidean distance. This routing helps to improve the quality of the prompts that are generated by the architecture 300 and provided to the AI coding assistant 114, since semantic similarity or other types of similarity can be used to identify data from the data source(s) 308 relevant to each input query 302.

As shown in FIG. 3, the data sources 308 include various types of data sources having information that could be relevant to the input queries 302. In this particular example, the data sources 308 include one or more code repositories, one or more sources of online text, and one or more sources of technology risk/issue management data. The one or more code repositories represent one or more sources of actual code, such as GITLAB or GITHUB. The one or more sources of online text represent one or more sources of information related to code, such as one or more online forums in which code and code problems/solutions are discussed (like STACK OVERFLOW). The one or more sources of technology risk/issue management data represent one or more sources of information related to identifying and managing risks and other issues associated with code, such as one or more internal repositories of information maintained by an organization or one or more external repositories.

An indexing operation 310 generally operates to split the data from the data sources 308 into smaller portions or "chunks," which allows various chunks of data relevant to each input query 302 to be obtained from the one or more data sources 308 and used during generation of the prompts for the AI coding assistant 114. The indexing operation 310 may use any suitable technique(s) to accurately split the data from the data sources 308 and to identify relevant chunks of information for the input queries 302, such as one or more retriever-augmented generation (RAG)-based techniques. As particular examples, actual code may be divided into code snippets, and text may be divided into sentences or paragraphs.

In some embodiments, for each chunk of information identified by the indexing operation 310, the indexing operation 310 may generate one or more embeddings of the chunk and store the one or more embeddings, such as in a vector store. As noted above, these embeddings may be used to identify chunks of information that appear more relevant to each input query 302. Thus, for each input query 302, one or more relevant chunks can be identified based on their embeddings and used as context for that input query 302 when a prompt is generated for the AI coding assistant 114. The embeddings may also be used to identify chunks of information (such as within the same data source 308 or across different data sources 308) that appear relevant to one another. Among other things, this can allow different related chunks of information to be identified and used as context for one or more of the input queries 302, effectively allowing the architecture 300 to identify connections between different data sources 308. In some cases, these approaches allow the architecture 300 to use context-aware deep linking to identify contexts for input queries 302 on the fly.

A filtering operation 312 generally operates to filter the chunks of information identified for each input query 302 in order to identify the more-relevant chunks of information. For example, the filtering operation 312 may rank the chunks of information based on similarity scores or other quality scores associated with the chunks of information. These quality scores may, for instance, identify the apparent relevance of each chunk of information to the corresponding input query 302. In some cases, the quality scores may be calculated using cosine similarities, Euclidean distances, or other similarity measurements based on the embeddings associated with the chunks of information and the input query 302. Also, in some cases, the indexing operation 310 or another previous operation in the pipeline may have ranked the chunks of information, in which case the filtering operation 312 may be said to perform a re-ranking of the chunks of information.

Once ranked, the filtering operation 312 may filter the ranked chunks of information, such as by selecting a subset of the ranked chunks for further use. For example, the filtering operation 312 may select the K most relevant chunks of information, where K≥1. The filtering operation 312 may also limit the selected chunks of information to a specified overall or combined length, such as a length that is based on (and does not exceed) a context length limit of the AI coding assistant 114. The context length limit of the AI coding assistant 114 can represent a limit on the amount of contextual data that can be provided to the AI coding assistant 114. Effectively, the scoring/ranking of the chunks can help to filter the contextual information for each input query 302, and the context length limitation of the AI coding assistant 114 can be used to further curate and trim the identified contextual information for each input query 302. If necessary (such as in response to low quality scores), the filtering operation 312 may initiate or cause another component to initiate a re-retrieval of chunks of information from the data source(s) 308, such as from one or more other or additional data sources 308, ideally with the goal of obtaining more-relevant and therefore higher-scoring chunks of information.

A prompt generation operation 314 generally operates to create a prompt for each input query 302, where the prompt can be provided to the AI coding assistant 114 for processing. For example, the prompt generation operation 314 may combine each input query 302 with the corresponding contextual information provided by the filtering operation 312 for that input query 302. The prompt generation operation 314 may also perform one or more post-processing functions to prepare each generated prompt for use by the AI coding assistant 114, such as by validating and optionally trimming the generated prompt if needed. Each generated prompt may be validated in any suitable manner, such as by determining whether the generated prompt has a proper format and length. Each generated prompt may also be trimmed in any suitable manner, such as by using response compression, another compression technique, or other technique to reduce the overall length of the generated prompt. Each generated prompt can be provided to the AI coding assistant 114, thereby providing curated context to the AI coding assistant 114 for each input query 302. The AI coding assistant 114 can generate a response for each input query 302, and each response can be output (such as to the user device 102*a*-102*d* that provided the input query 302).

In some cases, the architecture 300 may be able to receive different types of commands that can be used to control the outputs provided by the AI coding assistant 114. For example, using a "/basic" command may cause the architecture 300 to instruct the AI coding assistant 114 to output all generated code, such as all code needed for end-to-end software modeling. A "/connection" command may cause the architecture 300 to instruct the AI coding assistant 114 to output a code snippet for making one or more connections to one or more data sources. A "/query" command may cause the architecture 300 to instruct the AI coding assistant 114 to select one or more classes and create a function for querying data. A "/model" command may cause the architecture 300 to instruct the AI coding assistant 114 to generate a complex model, such as by using complex join, association, enumeration, and other complex constructs of PURE or other logical models. A "/mapping" command may cause the architecture 300 to instruct the AI coding assistant 114 to generate mapping snippets for different types, such as a filter mapping, a "group by" mapping, a join mapping, or other mapping that contains logic to transform a source model to a target model. A "/milestoning" command may cause the architecture 300 to instruct the AI coding assistant 114 to obtain specific milestoning snippets to generate models with different temporal states, such as business temporal, processing temporal, or bitemporal states. "Business temporal" means that the state of information retains all versions of data from the standpoint of when a business activity occurred. "Processing temporal" means that the state of information retains all versions of data from the standpoint of when the processing of an activity occurred and a business time is not known. "Bitemporal" means that the state of information retains all versions of data from the standpoint of when the processing of an activity occurred and a business time is known.

In some embodiments, the "/basic" command can be used to create an initial version of a model, where the initial version of the model may represent a starting point for modifications. The modifications can be made to the generated modifications using the "/model", "/mapping", "/milestoning", and "/connection" commands. The "/query" command can be used to obtain shareable insights or other knowledge about the model. Note, however, that these are examples only and that other or additional types of commands may be used to control the outputs provided by the AI coding assistant 114.

In some cases, the AI coding assistant 114 may represent or include a GITHUB COPILOT AI coding assistant or other commercially-available AI coding assistant. However, the AI coding assistant 114 may represent any machine learning-based coding assistant now known or later developed. Also, in some cases, the creativity of the AI coding assistant 114 can be exploited in various ways, such as by introducing the concept of classes and allowing the AI coding assistant 114 to creatively come up with relevant properties. Among other things, this can be a powerful enabler for users who are looking to model their data creatively, where coding tasks are more than just getting the syntax of code correct.

As described in more detail below, the architecture 300 can be used in various ways, including ways that customize the AI coding assistant 114 to generate code in a coding language on which the AI coding assistant 114 is not trained. For example, this can be accomplished by providing curated examples of coding language syntax and other chunks of information as part of the contextual information included in the prompts for the AI coding assistant 114. The examples of coding language syntax and other relevant chunks of information are designed for consumption by the AI coding assistant 114 and provide the AI coding assistant 114 with context for generating code in the coding language not used during training of the AI coding assistant 114. This may allow the functionality of the AI coding assistant 114 to be extended to any arbitrary coding language without requiring fine-tuning or retraining of the AI coding assistant 114.

Although FIG. 3 illustrates one example of an architecture 300 supporting context injection for an AI coding assistant, various changes may be made to FIG. 3. For example, various operations in FIG. 3 may be combined, further subdivided, replicated, omitted, or rearranged and additional components or functions may be added according to particular needs.

Figure 4:
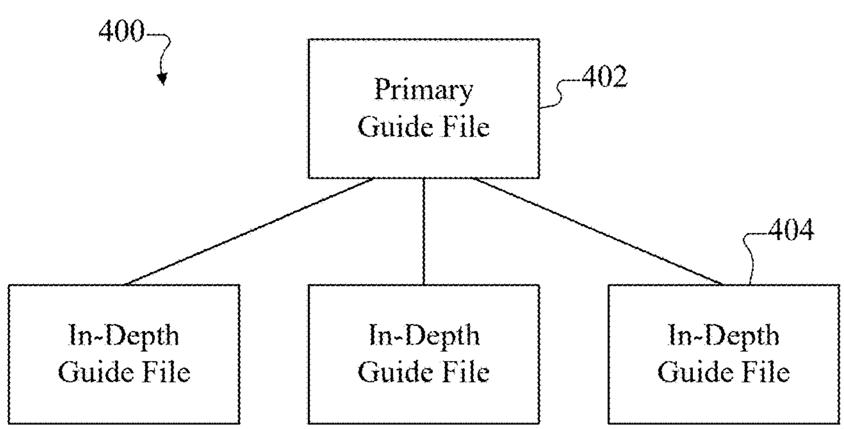
FIG. 4 illustrates an example guide file hierarchy supporting context injection for an AI coding assistant according to this disclosure.

FIG. 4 illustrates an example guide file hierarchy 400 supporting context injection for an AI coding assistant according to this disclosure. For ease of explanation, the guide file hierarchy 400 shown in FIG. 4 is described as being implemented using the application server 106 in the system 100 shown in FIG. 1, where the application server 106 may include one or more instances of the device 200 shown in FIG. 2 and may implement the architecture 300 shown in FIG. 3. However, the guide file hierarchy 400 may be implemented using any other suitable device(s) and in any other suitable system(s) using any other suitable architecture(s) designed in accordance with this disclosure.

As shown in FIG. 4, the guide file hierarchy 400 can be associated with a specified coding language and can include at least one primary guide file 402 and one or more in-depth guide files 404. The primary guide file 402 can introduce more general concepts of the specified coding language, and the in-depth guide file(s) 404 can introduce more complex concepts of the specified coding language. During prompt generation, at least part of one or more primary guide files 402 or one or more in-depth guide files 404 may be included as contextual information in a prompt.

In some embodiments, the in-depth guide files 404 can have file names that are intuitive so that users, the architecture 300, or other logic knows which in-depth guide file(s) 404 to inject as part of a prompt into the AI coding assistant 114. In other embodiments, the architecture 300 can select which in-depth guide file(s) 404 to inject as part of a prompt based on user intent. In some cases, each of the in-depth guide files 404 can include a curated set of instructions, and features can be introduced to the AI coding assistant 114 using a (text and code) snippet. The snippet can be very clear, concise, and prescriptive of what is expected from the AI coding assistant 114 given an input query 302. Also, in some cases, the in-depth guide files 404 can be scaled to include large corpuses of documentation and code (instead of curated sets of instructions). If needed or desired, the code snippets could represent synthetic or other code samples based on small samples of ideal sanitized code, which may be useful in cases where actual code may be too sensitive to share.

In some embodiments, instructions in the guide files 402, 404 can be explicit in order to help the AI coding assistant 114 understand an input query 302, such as by providing explicit instructions to "always" do something or "never" do something. For example, a guide file 404 might include text such as "Either create Association between two classes or make a class-owned non-primitive property in the second class (also called Composition). Do not create both." Also, text like "You should NOT make up any new syntax and only output [Coding Language] code" may work better than telling the AI coding assistant 114 simply "You should only output [Coding Language] code." In addition, text like "Please do not forget to add processing date or business date or none of these as needed based on temporal tags" could be used to cause the AI coding assistant 114 to include specific content in code.

The length of each guide file 402, 404 can also be adequately short so that the AI coding assistant 114 does not ignore the guide file 402, 404 or portions thereof. For example, the tail of a prompt injected into the AI coding assistant 114 can sometimes be ignored by the AI coding assistant 114 altogether. Thus, each guide file 402, 404 can be engineered so that the end of the guide file 402, 404 is considered by the AI coding assistant 114. If the length of a guide file 402, 404 becomes excessively long, the guide file 402, 404 may be reengineered or split into multiple components. It is also possible to consider fine-tuning or RAG-based solutions.

One possible use of the guide files 402, 404 is in overriding coding language concepts. For example, an AI coding assistant 114 may be trained using training data associated with one or more original coding languages. To customize the AI coding assistant 114 for use with a different coding language (one on which the AI coding assistant 114 was not trained), it may be necessary or desirable to override a concept supported by the one or more original coding languages in order to implement the same or similar concept in the different coding language in a different manner. Thus, for instance, if the different coding language uses a different way of declaring and defining a variable (like a date syntax), a guide file 402, 404 may be used to override other ways of declaring and defining a variable. In addition, in some embodiments, each of the guide files 402, 404 may support a general structure with tags for the entire file. For example, tags like "Instructions:", "Question:", and "Answer:" may be used. Note, however, that the tags may be selected or optimized based on the specific AI coding assistant 114 being used.

Another possible use of the guide files 402, 404 is in defining how the different types of commands that can be received or invoked by the architecture 300 (such as the "/basic", "/connection", "/query", "/model", "/mapping", and "/milestoning" commands) are handled by an AI coding assistant 114. For example, the at least one primary guide file 402 may define example concepts associated with a specific platform, such as the LEGEND data management platform. As particular examples, the at least one primary guide file 402 may define how a model is used, provide instructions or restrictions for creating the model, and provide example code snippets implementing classes or other aspects of example models. Multiple in-depth guide files 404 may provide additional details of how the different commands that can be received or invoked by the architecture 300 should be handled when creating or modifying models for that platform. For instance, the in-depth guide files 404 could provide instructions, restrictions, and/or code snippets that can be used by an AI coding assistant 114 when generating code for end-to-end software modeling in response to a "/basic" command, code for making one or more connections to one or more data sources in response to a "/connection" command, and code for selecting one or more classes and creating a function for querying data in response to a "/query" command. The in-depth guide files 404 could also provide instructions, restrictions, and/or code snippets that can be used by an AI coding assistant 114 when generating code for selecting one or more classes and creating a function for querying data in response to a "/model" command, generating a complex model in response to a "/mapping" command, and obtaining specific milestoning snippets in response to a "/milestoning" command. In other words, each type of command may be associated with at least one in-depth guide file 404 providing information that allows the AI coding assistant 114 to perform that command.

While the guide files 402, 404 are described here as being used in prompts for code generation, the guide files 402, 404 may be used in any other suitable manner. For example, finding relevant code samples based on natural language searches is a difficult and evolving problem space. The guide files 402, 404 can be used to overcome this problem by coupling natural language documentation and descriptions with code snippets and links to relevant software repositories. Based on users' natural language search requests, the guide files 402, 404 can be used to identify certain code snippets and/or links to certain software repositories that satisfy the users' natural language search requests.

Although FIG. 4 illustrates one example of a guide file hierarchy 400 supporting context injection for an AI coding assistant, various changes may be made to FIG. 4. For example, the guide file hierarchy 400 may include any suitable number of primary guide files 402 and/or any suitable number of in-depth guide files 404.

Figure 5:
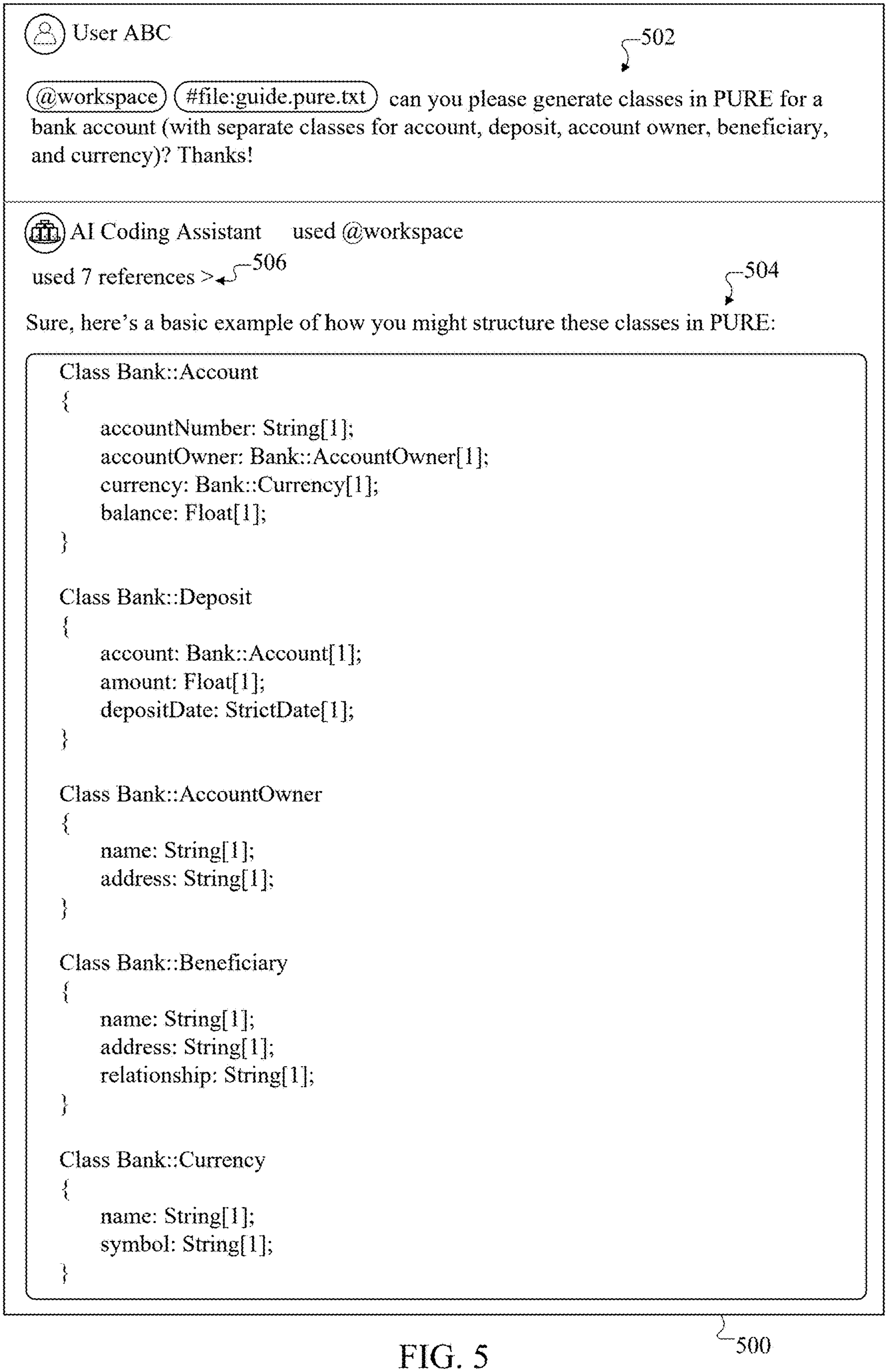
FIG. 5 illustrates example results for generation of code based on context injection for an AI coding assistant according to this disclosure.

FIG. 5 illustrates example results 500 for generation of code based on context injection for an AI coding assistant according to this disclosure. For ease of explanation, the results 500 shown in FIG. 5 are described as being obtained using the application server 106 in the system 100 shown in FIG. 1, where the application server 106 may include one or more instances of the device 200 shown in FIG. 2 and may implement the architecture 300 shown in FIG. 3. However, the results 500 may be obtained using any other suitable device(s) and in any other suitable device(s) and in any other suitable system(s) using any other suitable architecture(s) designed in accordance with this disclosure.

As shown in FIG. 5, a user input query 502 asks an AI coding assistant 114 to generate code. More specifically, the input query 502 asks the AI coding assistant 114 to generate a number of classes for a specific application (a bank account in this example) using a specific coding language (PURE in this example). The input query 502 includes examples of specific classes to be included in the generated code.

The application 112 can generate a suitable prompt for the AI coding assistant 114, such as by using various operations in the architecture 300. For example, the intent detection operation 304 can determine that the user wants to generate code for a financial or banking application using a specific coding language. The routing operation 306 can use this intent to identify one or more data sources 308 having data related to that intent, as well as one or more data sources 308 having data related to the specific coding language. The filtering operation 312 can filter identified chunks of information, and the prompt generation operation 314 can generate a prompt for the AI coding assistant 114 based on the input query 302 and the contextual information represented by the filtered chunks of information. Part of the prompt can include or be based on one or more primary guide files 402 and one or more in-depth guide files 404.

The AI coding assistant 114 can generate a response 504 containing the requested code based on the prompt produced by the architecture 300, and the requested code can be provided to the user for suitable use. The response 504 may optionally be associated with an identification 506 of one or more references (such as one or more data sources 308 or portions thereof) used to produce the response 504. In some cases, the user may be able to select the identification 506 and access each reference or information about each reference, such as by selecting an associated hyperlink to view a corresponding chunk of information.

Note that the AI coding assistant 114 here need not have been trained using the specific coding language requested by the input query 502 in order to generate the response 504. This is because the AI coding assistant 114 can be trained to have semantic understanding of various specified concepts, and the contextual information identified by the architecture 300 can allow the AI coding assistant to use that semantic understanding with a coding language on which the AI coding assistant 114 was not trained. This allows the AI coding assistant 114 to produce code relevant to a specified concept, regardless of its lack of training with the requested coding language. Thus, for instance, the AI coding assistant 114 can use its semantic understanding of classes learned for one or more coding languages on which the AI coding assistant 114 was trained, and this semantic understanding can be applied to a coding language on which the AI coding assistant 114 was not trained. In some embodiments, this can be accomplished using the guide file hierarchy 400 shown in FIG. 4 and described above. As a result, the AI coding assistant 114 can apply its understanding of classes and contextual information associated with the PURE coding language in order to generate code implementing the requested classes in the PURE coding language. The same type of functionality can be applied across any number of concepts and for any suitable coding languages.

Although FIG. 5 illustrates one example of results 500 for generation of code based on context injection for an AI coding assistant, various changes may be made to FIG. 5. For example, any suitable AI coding assistants 114 may be used. Also, the example input query 502 and the example response 504 and identification 506 shown here are for illustration only.

Figure 6:
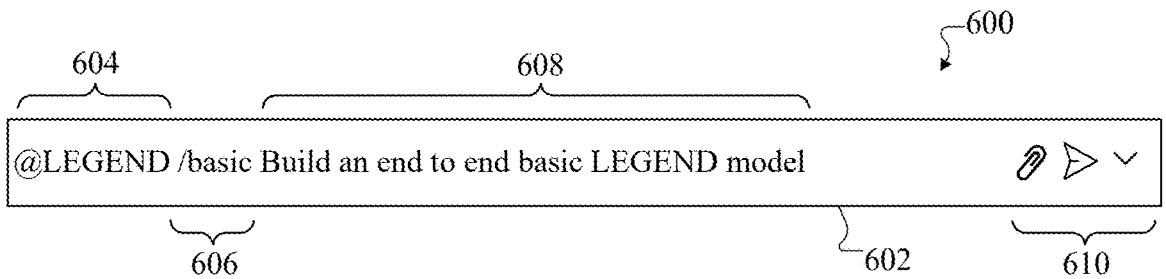
FIG. 6 illustrates an example interaction with an architecture supporting context injection for an AI coding assistant according to this disclosure.

FIG. 6 illustrates an example interaction 600 with an architecture supporting context injection for an AI coding assistant according to this disclosure. For ease of explanation, the interaction 600 shown in FIG. 6 is described as involving the application server 106 in the system 100 shown in FIG. 1, where the application server 106 may include one or more instances of the device 200 shown in FIG. 2 and may implement the architecture 300 shown in FIG. 3. However, the interaction 600 may involve any other suitable device(s) and in any other suitable system(s) using any other suitable architecture(s) designed in accordance with this disclosure.

As shown in FIG. 6, a user can interact with the architecture 300 using a chat-based approach, such as a chat-based AI assistant. Here, the user can enter text into a text box 602, such as by typing the text or speaking and having the user's device convert the speech into text. In this example, the text that is provided by the user includes a handle 604, a command type 606, and a command 608. The handle 604 identifies a desired application with which the user wishes to interact. In this example, the handle 604 identifies an AI coding assistant 114 associated with a LEGEND data management platform. However, other AI coding assistants 114 or other applications may be used in any given implementation.

The command type 606 identifies the type of the command 608 being sent to the application, such as when the command type 606 identifies the desired output to be provided by an AI coding assistant 114. The command 608 identifies the specific instruction to be performed by the AI coding assistant 114 from the user. For example, the command 608 can provide details of how the AI coding assistant 114 is expected to generate code used for end-to-end software modeling, generate a code snippet used for making one or more connections to one or more data sources, or select one or more classes and create a function for querying data. The command 608 can also provide details of how the AI coding assistant 114 is expected to generate a complex model, generate mapping snippets for different types, or generate milestoning snippets to generate models with different temporal states. The specific command 608 provided here can vary based on the command type 606 and the needs of the specific user.

As described above, in some embodiments, different guide files 116, 402, 404 may be used to support the use of different command types 606. For example, different in-depth guide files 404 may be provided for different command types 606. When the user submits a request with a specific command type 606, the architecture 300 can select one or more guide files 116, 402, 404 based on the specific command type 606 and include the guide file(s) 116, 402, 404 in a prompt or otherwise identify the guide file(s) 116, 402, 404 to the AI coding assistant 114 for use.

Various controls 610 are provided in association with the text box 602 for use by the user. For example, the left control 610 can be used to attach one or more files to the user's request, such as when the left control 610 allows the user to select one or more guide files 116, 402, 404 or other files. The middle control 610 can be used to submit the user's request to the architecture 300, such as when the middle control 610 allows the user's command type 606, command 608, and any attached files to be sent to the application identified by the handle 604. The right control 610 can be used to expand the list of possible controls and view any other suitable control(s) that might be used by the user.

In some cases, the text box 602 may display sample text to a user before the user begins or as the user is typing or otherwise providing text in the text box 602. For example, the text box 602 may display an example handle, an example command type, an example command, or a combination thereof. Also or alternatively, the text box 602 may display instructions to the user on how the user should fill in the text box 602. As a particular example, the text box 602 may display an example command type or instructions regarding the command type after the user has provided a suitable handle 604. As another particular example, the text box 602 may display an example command or instructions regarding the command after the user has provided a suitable handle 604 and a suitable command type 606.

In some embodiments, as noted above, the architecture 300 can be used with a LEGEND or other suitable data management platform. Various data management platforms (such as the LEGEND data management platform) support or represent a single system for accessing data and can support various built-in governance mechanisms (such as access control mechanisms). These types of platforms also often support the creation of data models, such as via PURE or other suitable programming languages. The data models define data and describe how connections can be made to the data. LEGEND or other data management platforms can be used to enable users to easily and quickly produce data, safely consume data, and/or elevate various types of data-driven processes, such as creating reports, building applications, and powering data analytics. In these embodiments, the architecture 300 may be used to cause one or more AI coding assistants 114 to generate the code needed to create or modify data models in the LEGEND or other data management platforms. However, the architecture 300 may be used for any other suitable purposes.

Although FIG. 6 illustrates one example of an interaction 600 with an architecture 300 supporting context injection for an AI coding assistant 114, various changes may be made to FIG. 6. For example, users may interact with the architecture 300 in any other suitable manner.

Figure 7:
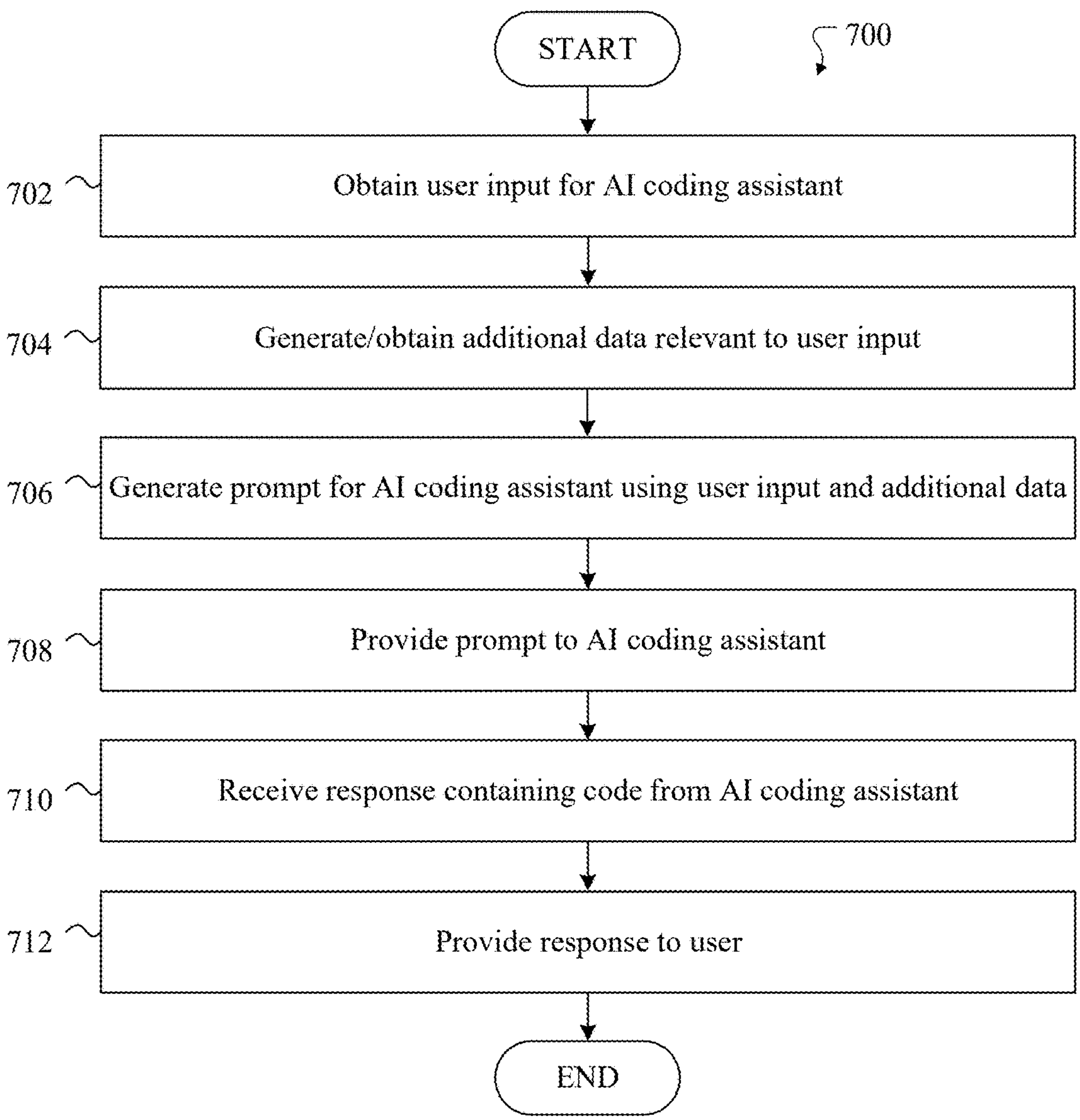
FIG. 7 illustrates an example method of context injection for an AI coding assistant according to this disclosure.

FIG. 7 illustrates an example method 700 of context injection for an AI coding assistant according to this disclosure. For ease of explanation, the method 700 shown in FIG. 7 is described as being implemented using the application server 106 in the system 100 shown in FIG. 1, where the application server 106 may include one or more instances of the device 200 shown in FIG. 2 and may implement the architecture 300 shown in FIG. 3. However, the method 700 may be performed using any other suitable device(s) and in any other suitable system(s) using any other suitable architecture(s) designed in accordance with this disclosure.

As shown in FIG. 7, user input for an AI coding assistant is obtained at step 702. This may include, for example, the processing device(s) 202 of the application server 106 receiving a chat-based text or other input query 302 from a user, such as from a user device 102*a*-102*d* of the user. In some cases, the input query 302 may be directed to an application identified by a handle 604 and can include a command type 606, a command 608, and optionally one or more attached files. The input query 302 can request generation, modification, or analysis of code, such as the creation/analysis of new code or the modification/analysis of existing code.

Additional data relevant to the user input can be generated or otherwise obtained at step 704. This may include, for example, the processing device(s) 202 of the application server 106 generating or obtaining additional data that could be useful for an AI coding assistant 114 when performing the function requested by the input query 302. In some embodiments, the additional data may include text and/or code snippets or other code examples that fit within a context length of the AI coding assistant 114. The text and code snippets/examples can be used by the AI coding assistant 114 when generating or modifying code. As described above, in some cases, the additional data may include multiple guide files 116, 402, 404, where the guide files 116, 402, 404 are associated with a hierarchy in which (i) a primary guide file 402 introduces more general concepts of a specified coding language and (ii) in-depth guide files 404 introduce more complex concepts of the specified coding language. The guide file(s) 116, 402, 404 may also or alternatively provide guidance on how a specific command type 606 should be executed. In some cases, the additional information may be generated by the application server 106, such as by using a trained machine learning model to generate one or more of the guide files 116, 402, 404 or other information.

Depending on the input query 302 and how the AI coding assistant 114 was trained, the additional data may explicitly instruct the AI coding assistant 114 to override a concept supported by one or more coding languages in order to implement the concept in a specified coding language in a different manner. As an example, the AI coding assistant 114 may have a semantic understanding of a specified concept, and the additional data may allow the AI coding assistant 114 to use the semantic understanding with a coding language on which the AI coding assistant was not trained to produce code relevant to the specified concept. As a particular example, the additional data may allow the AI coding assistant 114 to use a semantic understanding of a class associated with a coding language on which the AI coding assistant 114 was trained with a coding language on which the AI coding assistant 114 was not trained.

In some embodiments, the additional data relevant to the input query 302 may be generated or otherwise obtained by identifying an intent associated with the input query 302, such as by identifying one or more of a number of predefined or other intents as being associated with the input query 302. One or more data sources may be identified based on the identified intent, such as by identifying the data source or sources that may contain relevant information for the input query 302 based on the identified intent. Data relevant to the input query 302 can be obtained from the one or more identified data sources, such as by using cosine similarity or other metric(s) to identify which chunks of information from the identified data source(s) appear relevant to the input query 302. The data obtained from the one or more data sources can be ranked and filtered, such as by ranking the chunks of information based on their similarity scores or other quality scores. An overall length of the ranked and filtered data can be limited based on a context length limit of the AI coding assistant 114, and at least some of the ranked and filtered data that remains can be used as the additional data.

A prompt for the AI coding assistant is generated using the user input and the additional data relevant to the user input at step 706, and the prompt is provided to the AI coding assistant at step 708. This may include, for example, the processing device(s) 202 of the application server 106 generating a prompt for the AI coding assistant 114 that instructs the AI coding assistant 114 to perform the function requested by the input query 302. The additional data can be used to inform the AI coding assistant 114 of a context associated with the input query 302. As described above, in some cases, the additional data can customize the AI coding assistant 114 to generate code in a coding language on which the AI coding assistant 114 was not trained. This may be accomplished, for instance, by providing one or more curated examples of coding language syntax designed for consumption by the AI coding assistant 114. A response containing code is received from the AI coding assistant at step 710, and the response is provided to the user at step 712. This may include, for example, the processing device(s) 202 of the application server 106 receiving the response containing the requested code from the AI coding assistant 114 based on the prompt and displaying or otherwise providing the requested code to the user device 102*a*-102*d* of the user.

Although FIG. 7 illustrates one example of a method 700 of context injection for an AI coding assistant 114, various changes may be made to FIG. 7. For example, while shown as a series of steps, various steps in FIG. 7 may overlap, occur in parallel, occur in a different order, or occur any number of times (including zero times). Also, while a single interaction is shown in FIG. 7, there may be repeated interactions between the user and the AI coding assistant 114, such as when the user submits one or more additional input queries 302 requesting actions based on results from one or more previous input queries 302.

It should be noted that the functions described above can be implemented in any suitable manner. For example, in some embodiments, at least some of the functions can be implemented or supported using one or more software applications or other software instructions that are executed by the processing device(s) 202 of the application server 106 or other device(s). In other embodiments, at least some of the functions can be implemented or supported using dedicated hardware components. In general, the functions described above can be performed using any suitable hardware or any suitable combination of hardware and software/firmware instructions. Also, the functions described above can be performed by a single device or by multiple devices.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:

obtaining, using at least one processor of an electronic device, a user input for an artificial intelligence (AI) coding assistant, the user input requesting generation, modification, or analysis of code;

generating, using the at least one processor, a prompt for the AI coding assistant using the user input and additional data comprising multiple guide files that are relevant to the user input; and providing, using the at least one processor, the prompt to the AI coding assistant;

wherein the additional data is included in the prompt and informs the AI coding assistant of a context associated with the user input, the additional data customizing the AI coding assistant to generate code in a coding language on which the AI coding assistant is not trained by providing curated examples of coding language syntax designed for consumption by the AI coding assistant;

wherein the multiple guide files comprise a hierarchy in which (i) at least one primary guide file introduces more general concepts of a specified coding language and (ii) one or more in-depth guide files introduce more complex concepts of the specified coding language; and wherein each of the in-depth guide files includes a curated set of instructions, and features are introduced to the AI coding assistant using a snippet of what is expected from the AI coding assistant for a given input query.

2. The method of claim 1, further comprising:

generating the additional data relevant to the user input using a trained machine learning model, the additional data comprising code examples that fit within a context length of the AI coding assistant.

3. The method of claim 1, wherein the additional data comprises text and code snippets.

4. The method of claim 1, wherein the additional data explicitly instructs the AI coding assistant to override a concept supported by one or more other coding languages in order to implement the concept in a specified coding language in a different manner.

5. The method of claim 1, wherein:

the AI coding assistant has a semantic understanding of a specified concept; and the additional data allows the AI coding assistant to use the semantic understanding with the coding language on which the AI coding assistant is not trained to produce code relevant to the specified concept.

6. The method of claim 5, wherein the additional data allows the AI coding assistant to use a semantic understanding of a class associated with a coding language on which the AI coding assistant is trained with the coding language on which the AI coding assistant is not trained.

7. The method of claim 2, wherein generating the additional data relevant to the user input comprises:

identifying an intent associated with the user input;

identifying one or more data sources based on the intent;

obtaining data relevant to the user input from the one or more data sources;

ranking and filtering the data obtained from the one or more data sources; and limiting a length of the ranked and filtered data based on a context length limit of the AI coding assistant.

8. The method of claim 1, wherein one or more of the multiple guide files are generated using one or more large language models (LLMs).

9. The method of claim 8, wherein the one or more LLMs generate the one or more of the multiple guide files from a corpus of documentation.

10. The method of claim 8, wherein the multiple guide files are optimized to include examples in a smallest number of tokens possible.

11. An apparatus comprising:

at least one processor configured to:

obtain a user input for an artificial intelligence (AI) coding assistant, the user input requesting generation, modification, or analysis of code;

generate a prompt for the AI coding assistant using the user input and additional data comprising multiple guide files relevant to the user input; and provide the prompt to the AI coding assistant;

wherein the additional data is included in the prompt and is configured to inform the AI coding assistant of a context associated with the user input, the additional data configured to customize the AI coding assistant to generate code in a coding language on which the AI coding assistant is not trained by providing curated examples of coding language syntax designed for consumption by the AI coding assistant;

wherein the multiple guide files comprise a hierarchy in which (i) at least one primary guide file introduces more general concepts of a specified coding language and (ii) one or more in-depth guide files introduce more complex concepts of the specified coding language; and wherein each of the in-depth guide files includes a curated set of instructions, and features are introduced to the AI coding assistant using a snippet of what is expected from the AI coding assistant for a given input query.

12. The apparatus of claim 11, wherein the at least one processor is further configured to generate the additional data relevant to the user input using a trained machine learning model, the additional data comprising code examples that fit within a context length of the AI coding assistant.

13. The apparatus of claim 11, wherein the additional data explicitly instructs the AI coding assistant to override a concept supported by one or more other coding languages in order to implement the concept in a specified coding language in a different manner.

14. The apparatus of claim 11, wherein:

the AI coding assistant has a semantic understanding of a specified concept; and the additional data allows the AI coding assistant to use the semantic understanding with the coding language on which the AI coding assistant is not trained to produce code relevant to the specified concept.

15. The apparatus of claim 14, wherein the additional data allows the AI coding assistant to use a semantic understanding of a class associated with a coding language on which the AI coding assistant is trained with the coding language on which the AI coding assistant is not trained.

16. The apparatus of claim 12, wherein, to generate the additional data relevant to the user input, the at least one processor is configured to:

identify an intent associated with the user input;

identify one or more data sources based on the intent;

obtain data relevant to the user input from the one or more data sources;

rank and filter the data obtained from the one or more data sources; and limit a length of the ranked and filtered data based on a context length limit of the AI coding assistant.

17. A non-transitory computer readable medium containing instructions that when executed cause at least one processor to:

obtain a user input for an artificial intelligence (AI) coding assistant, the user input requesting generation, modification, or analysis of code;

generate a prompt for the AI coding assistant using the user input and additional data comprising multiple guide files relevant to the user input; and provide the prompt to the AI coding assistant;

wherein the additional data is included in the prompt and is configured to inform the AI coding assistant of a context associated with the user input, the additional data configured to customize the AI coding assistant to generate code in a coding language on which the AI coding assistant is not trained by providing curated examples of coding language syntax designed for consumption by the AI coding assistant;

wherein the multiple guide files comprise a hierarchy in which (i) at least one primary guide file introduces more general concepts of a specified coding language and (ii) one or more in-depth guide files introduce more complex concepts of the specified coding language; and wherein each of the in-depth guide files includes a curated set of instructions, and features are introduced to the AI coding assistant using a snippet of what is expected from the AI coding assistant for a given input query.

18. The non-transitory computer readable medium of claim 17, wherein the instructions when executed further cause the at least one processor to generate the additional data relevant to the user input using a trained machine learning model, the additional data comprising code examples that fit within a context length of the AI coding assistant.

19. The non-transitory computer readable medium of claim 17, wherein:

the AI coding assistant has a semantic understanding of a specified concept; and the additional data allows the AI coding assistant to use the semantic understanding with the coding language on which the AI coding assistant is not trained to produce code relevant to the specified concept.

20. The non-transitory computer readable medium of claim 17, wherein the instructions that when executed cause at least one processor to generate the additional data relevant to the user input comprise:

instructions that when executed cause the at least one processor to:

identify an intent associated with the user input;

identify one or more data sources based on the intent;

obtain data relevant to the user input from the one or more data sources;

rank and filter the data obtained from the one or more data sources; and limit a length of the ranked and filtered data based on a context length limit of the AI coding assistant.

* * * * *